United States Patent
Wang et al.

(10) Patent No.: US 8,185,920 B2
(45) Date of Patent: May 22, 2012

(54) EJECTING MECHANISM CAPABLE OF PREVENTING ACCIDENTAL TOUCH AND DISK DRIVE USING THE SAME

(75) Inventors: Shun-Lung Wang, Taipei (TW);
Chun-Hao Liao, Taipei (TW);
Chao-Ming Chu, Taipei (TW);
Chih-Min Huang, Taipei (TW); Ta-Wei Liu, Taipei (TW); Hsuan-Wu Wei, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 734 days.

(21) Appl. No.: 12/338,649

(22) Filed: Dec. 18, 2008

(65) Prior Publication Data
US 2009/0199221 A1     Aug. 6, 2009

(30) Foreign Application Priority Data

Feb. 1, 2008   (TW) ................................ 97104049 A

(51) Int. Cl.
*G11B 33/02* (2006.01)
*G11B 17/03* (2006.01)
(52) U.S. Cl. ........................................ 720/646; 720/610
(58) Field of Classification Search ................... 720/601, 720/606, 607, 609–611, 613, 646, 647, 652–655, 720/657, 636–638; 361/679.26–679.3, 679.33–679.39, 679.55–679.58
See application file for complete search history.

(56) References Cited

U.S. PATENT DOCUMENTS

| | | | | |
|---|---|---|---|---|
| 4,507,695 | A * | 3/1985 | Kobayashi | 360/251 |
| 2005/0114874 | A1* | 5/2005 | Hsieh | 720/646 |
| 2006/0143632 | A1* | 6/2006 | Matsuda et al. | 720/638 |
| 2008/0134222 | A1* | 6/2008 | Kawabe et al. | 720/601 |
| 2009/0073644 | A1* | 3/2009 | Yang | 361/679.4 |

FOREIGN PATENT DOCUMENTS
CN       2631002       8/2004
* cited by examiner

*Primary Examiner* — Nathan Danielsen
(74) *Attorney, Agent, or Firm* — Rabin & Berdo, PC

(57) ABSTRACT

An ejecting mechanism capable of preventing an accidental touch is disposed in a housing having a tray and used for ejecting the tray out of the housing. The ejecting mechanism includes a tray ejecting button and a front cover. The front cover is disposed at the housing and located at the ejecting direction of the tray. The front cover has a sliding key including a pressing body and a triggering body connected to one end of the pressing body. When the pressing body drives the triggering body to slide until the triggering body aligns to the tray ejecting button, the pressing body is capable of being forced to drive one end of the triggering body to trigger the tray ejecting button to eject the tray.

10 Claims, 4 Drawing Sheets

US 8,185,920 B2

EJECTING MECHANISM CAPABLE OF PREVENTING ACCIDENTAL TOUCH AND DISK DRIVE USING THE SAME

This application claims the benefit of Taiwan application Serial No. 97104049, filed Feb. 1, 2008, the subject matter of which is incorporated herein by reference.

BACKGROUND OF THE INVENTION

1. Field of the Invention

The invention relates to a disk drive and, more particularly, to an ejecting mechanism and a disk drive using the same.

2. Description of the Related Art

Nowadays, in the current age of information overload, most multimedia products are published in form of optical disks. With the popularity of consumer optical disks, almost every computer should be used with an optical disk drive, no matter it is a desktop computer or a notebook computer. Therefore, the optical disk drive plays a decisive role in the multimedia field.

Nowadays, the front cover of an optical disk drive has a key structure such as a button. Generally speaking, a tray is ejected by directly pressing the key structure to trigger the tray ejecting button in the optical disk drive.

However, when using a computer, especially a notebook computer, a user easily makes the tray of an optical disk drive ejected when he touches the key structure accidentally in the process of moving or operating. If an obstacle is on the ejecting path of the tray, the tray easily bumps into the obstacle in ejecting. Thus, parts of the optical disk drive, such as the front cover, the tray or a bearing, may be damaged under the vibration, which decreases the lifespan of the optical disk drive.

BRIEF SUMMARY OF THE INVENTION

The invention relates to an ejecting mechanism and a disk drive using the same. A tray ejecting button may be triggered to eject a tray of the disk drive only after a sliding key slides to a position corresponding to the position of the tray ejecting button. Thus, the tray would not be ejected when the sliding key is touched accidentally.

A disk drive is provided according to the invention. The disk drive includes a housing, a tray and an ejecting mechanism. The tray is disposed in the housing. The ejecting mechanism is disposed at the housing and used for ejecting the tray out of the housing. The ejecting mechanism includes a tray ejecting button and a front cover. The tray ejecting button is disposed in the housing and used for being triggered to eject the tray. The front cover is disposed at the housing and located at the ejecting direction of the tray. The front cover has a first through hole and a sliding key. The position of the first through hole corresponds to the tray ejecting button. The sliding key includes a pressing body, a triggering body and a resilient element. The triggering body is connected to one end of the pressing body, and it passes through the first through hole. The pressing body can drive the triggering body to slide along the first through hole. The resilient element is connected to the pressing body and the front cover, and it has a first elastic part. When the pressing body drives the triggering body to slide along the first through hole until the triggering body aligns to the tray ejecting button, the first elastic part is deformed and stores elastic potential energy. When the triggering body aligns to the tray ejecting button, and the pressing body is forced to drive one end of the triggering end to trigger the tray ejecting button, the tray is ejected.

These and other features, aspects, and advantages of the present invention will become better understood with regard to the following description, appended claims, and accompanying drawings.

DETAILED DESCRIPTION OF THE EMBODIMENTS

The invention provides an ejecting mechanism capable of preventing an accidental touch and a disk drive using the same. The ejecting mechanism has a tray ejecting button and a front cover having a sliding key. The sliding key includes a triggering body. After the sliding key is forced to slide until the triggering body aligns to the tray ejecting button, along with the sliding key is forced to drive one end of the triggering body to trigger the tray ejecting button, the tray is ejected. A preferred embodiment is described in detail hereinbelow, and it is just an implementing manner under the spirit of the invention. The words and drawings for describing dose not limit the invention.

Figure 1A:
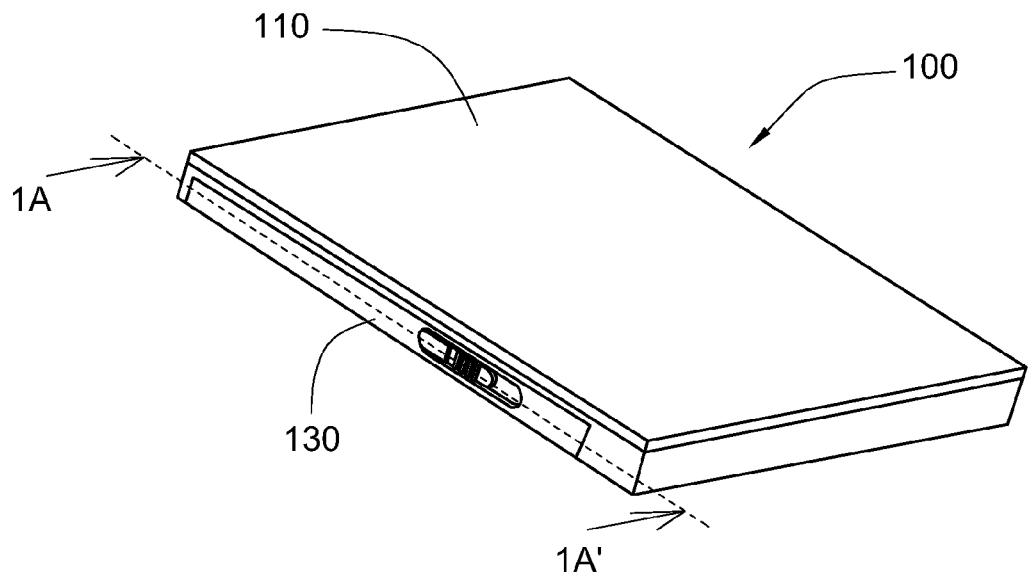
FIG. 1A is a schematic diagram showing a disk drive according to a preferred embodiment of the invention.
Figure 1B:
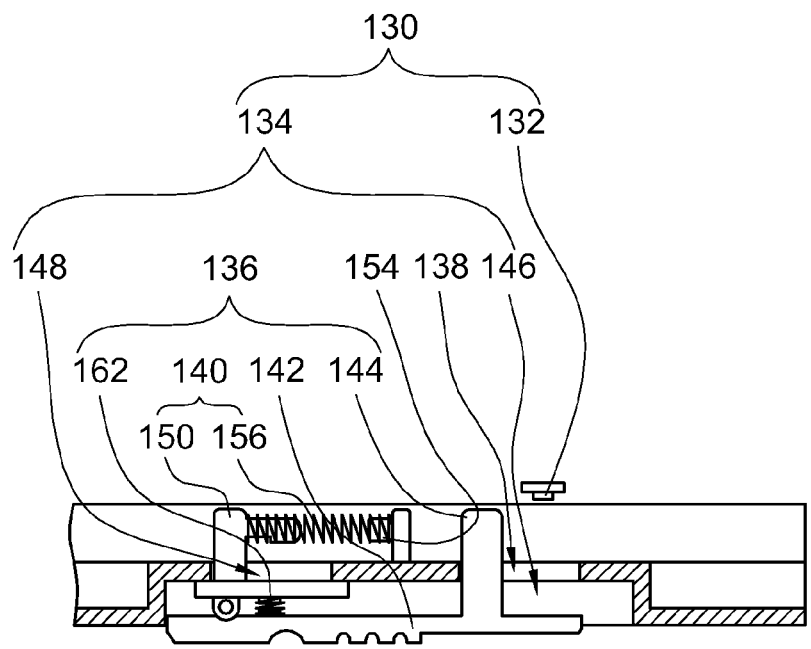
FIG. 1B is a sectional diagram showing the front cover in FIG. 1A along the line 1A-1A'.

FIG. 1A is a schematic diagram showing a disk drive according to a preferred embodiment of the invention. As shown in FIG. 1A, the disk drive 100 includes a housing 110, a tray 120 (shown in FIG. 3B) and an ejecting mechanism 130 capable of preventing an accidental touch. The tray 120 is disposed in the housing 110. The ejecting mechanism 130 is disposed at the housing 110 and used for ejecting the tray 120 out of the housing 110. FIG. 1B is a sectional diagram showing the front cover in FIG. 1A along the line 1A-1A'. As shown in FIG. 1B, the ejecting mechanism 130 includes a tray ejecting button 132 and a front cover 134. The tray ejecting button 132 is disposed in the housing 110 and used for being triggered to eject the tray 120. The front cover 134 is disposed at the housing 110 and is located at the ejecting direction of the tray 120. The front cover 134 has a first through hole 138 and a sliding key 136. The position of the first through hole 138 corresponds to that of the tray ejecting button 132. The sliding key 136 includes a pressing body 142, a triggering body 144 and a resilient element 140. The resilient element 140 is connected to pressing body 142 and the front cover 134, and it has a first elastic part 156. The triggering body 144 is connected to one end of the pressing body 142, and it passes through the first through hole 138. When the pressing body 142 drives the triggering body 144 to slide along the first though hole 138 until the triggering body 144 aligns to the tray ejecting button 132, the first elastic part 156 is deformed and stores elastic potential energy. When the triggering body 144 aligns to the tray ejecting button 132, the pressing body 142 may be forced to drive one end of the triggering body 144 to trigger the tray ejecting button 132. Thus, the tray 120 is ejected.

Figure 2A:
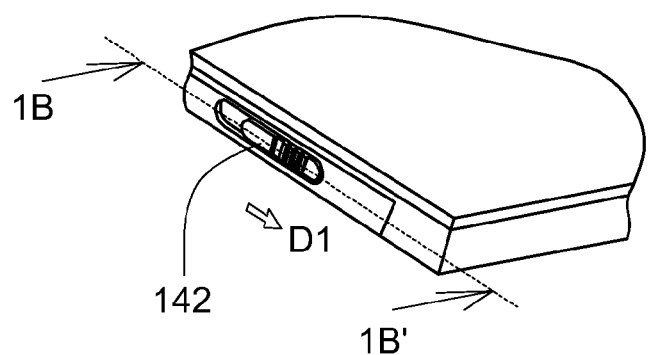
FIG. 2A is a schematic diagram showing the appearance of the disk drive of the embodiment in an unlocked state.
Figure 2B:
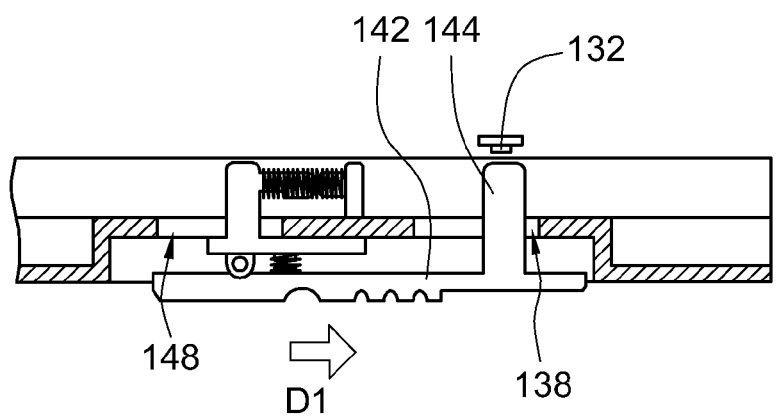
FIG. 2B is a sectional diagram showing the front cover in FIG. 2A along the line 1B-1B'.

FIG. 2A is a schematic diagram showing the appearance of the disk drive of the embodiment in an unlocked state. FIG. 2B is a sectional diagram showing the front cover in FIG. 2A along the line 1B-1B'. As shown in FIG. 2A, when the pressing body 144 is forced to move toward a first direction D1, the pressing body 142 drives the triggering body 144 to slide along the first through hole 138 until the triggering body 144 aligns to the tray ejecting button 132. As shown in FIG. 1B, at that moment, the ejecting mechanism is in an unlocked state. That is, if the pressing body 144 is pressed in that state, one end of the triggering body 144 is driven to trigger the tray ejecting button 132, which makes the tray 120 ejected out of the housing 110.

Figure 3A:
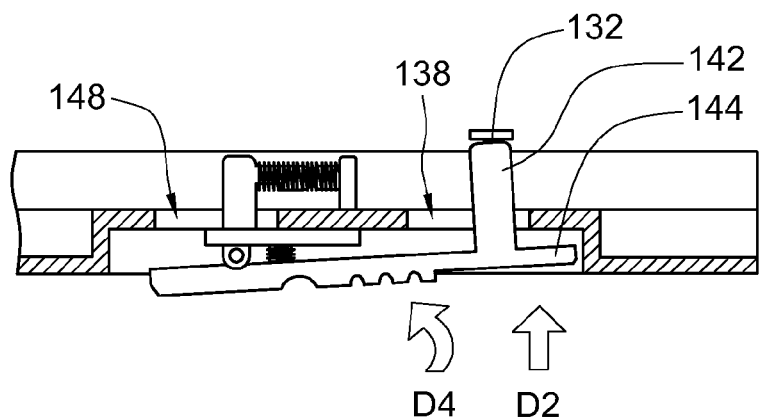
FIG. 3A is a schematic diagram showing that the pressing body in FIG. 2B is forced to drive one end of the triggering body to trigger the tray ejecting button.
Figure 3B:
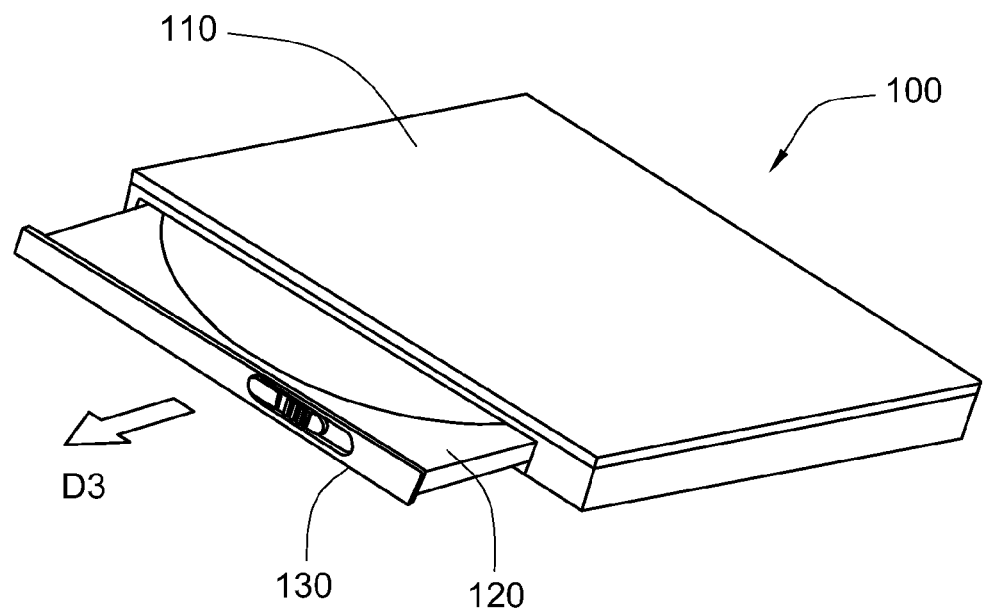
FIG. 3B is a schematic diagram showing that the tray of the embodiment is ejected.

FIG. 3A is a schematic diagram showing that the pressing body in FIG. 2B is forced to drive one end of the triggering body to trigger the tray ejecting button. FIG. 3B is a schematic diagram showing that the tray of the embodiment is ejected. As shown in FIG. 3A, when the triggering body 144 aligns to the tray ejecting button 132, and the pressing body 142 is forced to move toward a second direction D2, the pressing body 142 drives one end of the triggering body 144 to trigger the tray ejecting button 132 to eject the tray 120 toward an ejecting direction D3 shown in FIG. 3B. As shown in FIG. 2B and FIG. 3A, the second direction D2 in FIG. 3A is perpendicular to the first direction D1 in FIG. 2B in substance.

As shown in FIG. 1B, the front cover 134 further has a runner 146. The sliding key 136 is capable of sliding at the runner 146 between a first side 170 (shown in FIG. 6) and a second side 172 (shown in FIG. 6) of the runner 146. In detail, the sliding key 136 in FIG. 1B is located at the first side 170 of the runner 146, while the sliding key 136 in FIG. 2B is located at the second side 172 of the runner 146. In addition, the first through hole 138 is located at the runner 146. For example, it is at the bottom of the runner 146. Via the disposition of the runner 146, when the operation for the pressing body 142 is not affected, part or all of the pressing body 142 may be held in the runner 146. Thus, the pressing body 142 would not excessively protrude from the front cover 134, and the appearance is esthetical.

In addition, as shown in FIG. 1B, the front cover 134 further has a second through hole 148 located at the runner 146. For example, the second through hole 148 is located at the bottom of the runner 146. The resilient element 140 passes through the second through hole 148 to be connected to the front cover 134. The resilient element 140 further includes a linkage structure 150. The first elastic part 156 is connected to the linkage structure 150 and the front cover 134. The linkage structure 150 is capable of sliding at the second through hole 148. The other end of the pressing body 142 is rotatably connected to the linkage structure 150. Since the disposition of the linkage structure 150 may share in the sliding load of the pressing body 142 and reduce the sliding abrasion of the pressing body 142, the sliding key 136 may steadily slide at the runner 146.

Figure 4:
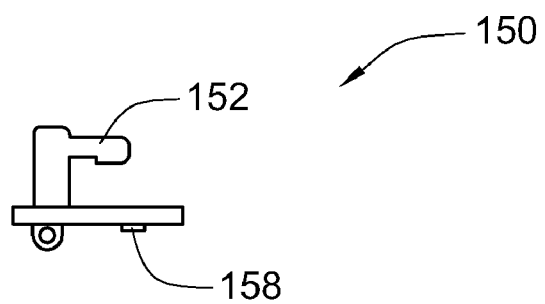
FIG. 4 is a schematic diagram showing the linkage structure of the resilient element in FIG. 1B.

FIG. 4 is a schematic diagram showing the linkage structure of the resilient element in FIG. 1B. As shown in FIG. 4 and FIG. 1B. The linkage structure 150 has a first rod part 152, and the front cover 134 has a first protruding portion 154 (shown in FIG. 1B). The two ends of a first elastic part 156 are disposed at the first protruding portion 154 and the first rod part 152, respectively. As shown in FIG. 2B, when the pressing body 142 drives the triggering body 144 to slide along the first through hole 138 until the triggering body 144 aligns to the tray ejecting button 132, the linkage structure 150 slides at the second through hole 148 along the first direction D1 at the same time. At that time, the first elastic part 156 is deformed and stores elastic potential energy. After the pressing body 142 is released, the elastic potential energy pushes the sliding key 136 back to the first side 170 (as shown in FIG. 1B) from the second side 172 (as shown in FIG. 2B). Thus, the ejecting mechanism 130 may keep a locked state constantly. The appearance of the disk drive in a locked state is shown in FIG. 1B. When the ejecting mechanism 130 is in a locked state, the triggering body 144 does not aim the tray ejecting button 132. Therefore, if the sliding key is touched accidentally, the tray would not be ejected.

Figure 5:
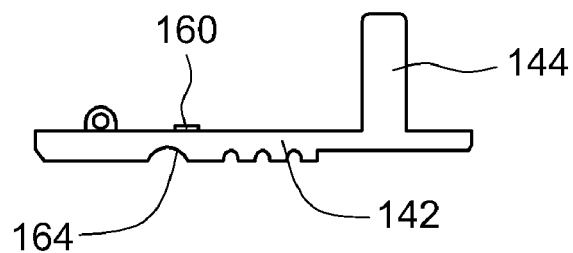
FIG. 5 is a schematic diagram showing that the pressing body in FIG. 1B has a second protruding portion

In addition, as shown in FIG. 1B, the sliding key 136 further includes a second elastic part 162 connecting the linkage structure 150 and the pressing body 142. Further, as shown in FIG. 4, the linkage structure 150 further has a second rod part 158, and the two ends of the second elastic part 162 are disposed at the second rod part 158 and the pressing body 142. As shown in FIG. 3A, when the pressing body 142 is forced to drive one end of the triggering body 144 to trigger the tray ejecting button 132 toward the second direction D2, the pressing body 142 rotates toward a third direction D4 relative to the linkage structure 150. At that moment, after the pressing body 142 is released, the elastic potential energy pushes the sliding key 136 back to the original position. Therefore, the triggering body 142 does not keep triggering the tray ejecting button 132, and the tray may retract into the housing 110 normally. FIG. 5 is a schematic diagram showing that the pressing body in FIG. 1B has a second protruding portion. As shown in FIG. 5, preferably, the pressing body 142 has a second protruding portion 160, and one end of the second elastic part 162 may be disposed on the second protruding portion 160 to allow the second elastic part 162 to have preferred stability.

As shown in FIG. 1B, the pressing body 142 is exposed outside the front cover 134. When the appearance is not affected, the pressing body 142 exposed out of the front cover 134 facilitates the operation for the sliding key 136. Preferably, as shown in FIG. 5, the pressing body 142 has a pushing portion 164 via which the pressing body 142 is pushed more easily. The pushing portion 164 may have a concave shape shown in FIG. 5, and it also may be a convex shape (not shown). In addition, as shown in FIG. 1B, FIG. 2B and FIG. 3A, the pressing body 142 covers the linkage structure 150, the first through hole 138 and the second through hole 148 in the process of sliding or rotating towards the third direction D4. Thus, the disk drive is esthetical.

Figure 6:
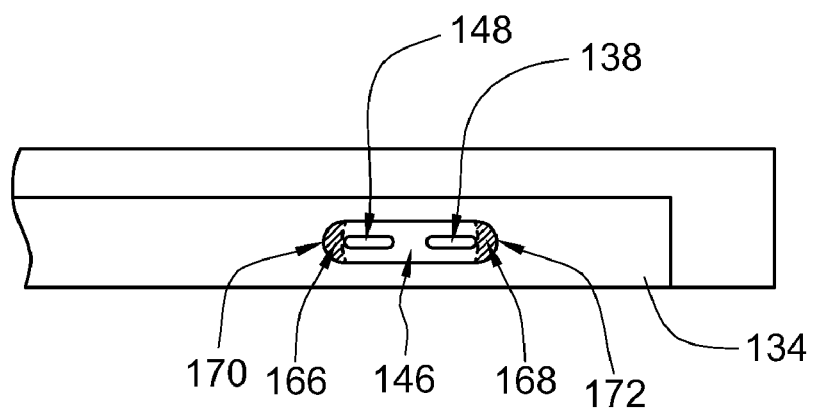
FIG. 6 is a schematic diagram showing a front cover without the sliding key according to the embodiment.

FIG. 6 is a schematic diagram showing a front cover without the sliding key according to the embodiment. The front cover 134 has a first identification mark 166 and a second identification mark 168. The first identification mark 166 is disposed at the first side 170 of the runner 146 and used for showing that the ejecting mechanism 130 is in an unlocked state. The second identification mark 168 is disposed at the second side 172 of the runner 146 and used for showing that the ejecting mechanism 130 is in a locked state. Each of the first identification mark 166 and the second identification mark is one of a color, a symbol, a pattern and a word. Furthermore, when the sliding key 136 is located at the first side 170, the first identification mark 166 which is, for example, green is covered by the pressing body 142, and the second identification mark 168 which is, for example, orange is exposed. On the contrary, when the sliding key 136 slides to the second side 172, the second identification mark 168 is covered by the pressing body 142, and the first identification mark 166 is exposed. That is, when the identification mark is green, the tray may be ejected. On the contrary, when the identification mark is orange, the tray cannot be ejected. Thus, via the difference of the identification marks, whether the ejecting mechanism is in a locked state or an unlocked state may be recognized.

The ejecting mechanism capable of preventing an accidental touch disclosed in the embodiment and the disk drive using the same have many advantages. Some of the advantages are described hereinbelow.

First, before the tray ejecting button of the disk drive is triggered, the sliding key needs to be slid to aim the tray ejecting button. Therefore, ejecting the tray by touching the sliding key accidentally is prevented.

Second, the first identification mark and the second identification mark allow users to recognize that the ejecting mechanism is in a locked state or an unlocked state easily.

Third, the first elastic part may keep the ejecting mechanism in a closed state constantly. The tray is not ejected when the sliding key is touched accidentally in a locked state.

Fourth, the second elastic part may push the sliding key back to the position of the locked state after the sliding key is released. Therefore, the sliding key does not keep triggering the tray ejecting button, and the tray may be retracted into the housing normally.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A disk drive comprising:
    a housing;
    a tray disposed in the housing; and
    an ejecting mechanism disposed at the housing including:
        a tray ejecting button disposed in the housing; and
        a front cover having a first through hole and a sliding key, wherein the position of the first through hole corresponds to that of the tray ejecting button, and the sliding key includes:
            a pressing body exposed outside the housing;
            a triggering body connected to one end of the pressing body and passing through the first through hole; and
            a resilient element connected to the pressing body and the front cover, wherein when the pressing body drives the triggering body to slide along the first through hole until the triggering body aligns to the tray ejecting button, the resilient element is deformed and stores elastic potential energy;
        wherein when the triggering body aligns to the tray ejecting button, the pressing body is capable of being forced to drive one end of the triggering body to trigger the tray ejecting button to eject the tray.

2. The disk drive according to claim 1, wherein the front cover has a runner where the sliding key is slidingly disposed, and the first through hole is located at the runner.

3. The disk drive according to claim 2, wherein the front cover has a second through hole located at the runner, and the resilient element passes through the second through hole to connect to the front cover.

4. The disk drive according to claim 3, wherein the resilient element further comprises:
    a first elastic part; and
    a linkage structure, wherein the first elastic part connects the linkage structure and the front cover, the linkage structure is capable of sliding at the second through hole, and the other end of the pressing body is capable of connecting to the linkage structure rotatably.

5. The disk drive according to claim 4, wherein the pressing body covers the linkage structure, the first through hole and the second through hole.

6. The disk drive according to claim 4, wherein the front cover has a first protruding portion, the linkage structure has a first rod part, and the two ends of the first elastic part are disposed at the first protruding portion and the first rod part, respectively.

7. The disk drive according to claim 4, wherein the sliding key further comprises:
    a second elastic part connecting the linkage structure and the pressing body, when the pressing body is forced to drive one end of the triggering body to trigger the tray ejecting button, the pressing body rotates relative to the linkage structure, and the second elastic part is deformed and stores elastic potential energy.

8. The disk drive according to claim 7, wherein the linkage structure has a second rod part, and the two ends of the second elastic part are disposed at the second rod part and the pressing body, respectively.

9. The disk drive according to claim 2, wherein the front cover further has:
    a first identification mark disposed at a first side of the runner and used for showing that the ejecting mechanism is in an unlocked state; and
    a second identification mark disposed at a second side of the runner and used for showing that the ejecting mechanism is in a locked state;
    when the sliding key slides to the first side of the runner, the first identification mark is covered by the pressing body, and the second identification mark is exposed; when the sliding key slides to the second side of the runner, the second identification mark is covered by the pressing body, and the first identification mark is exposed.

10. The disk drive according to claim 9, wherein each of the first identification mark and the second identification mark is one of a color, a symbol, a pattern and a word.

* * * * *